United States Patent [19]

Themistos et al.

[11] Patent Number: 4,738,428

[45] Date of Patent: Apr. 19, 1988

[54] SECURITY DEVICE FOR BUSINESS MACHINES

[75] Inventors: John H. Themistos, East Longmeadow; William P. Brady, Wilberham, both of Mass.

[73] Assignee: Secure-It, Inc., East Longmeadow, Mass.

[21] Appl. No.: 72,127

[22] Filed: Jul. 9, 1987

[51] Int. Cl.⁴ ............................................ F16M 13/00

[52] U.S. Cl. .................................... 248/551; 248/553; 70/58; 24/573

[58] Field of Search .................... 248/551, 553; 70/58; 24/573, 580

[56] References Cited

U.S. PATENT DOCUMENTS

| | | | |
|---|---|---|---|
| 2,497,797 | 2/1950 | Rogers | 248/551 |
| 2,820,533 | 1/1958 | Mount | 24/573 |
| 3,410,122 | 11/1968 | Moses | 248/553 |
| 4,300,371 | 11/1981 | Herwick et al. | 70/58 |
| 4,385,744 | 5/1983 | Sherman et al. | 248/551 |
| 4,577,563 | 3/1986 | Sidler | 248/553 |
| 4,656,848 | 4/1987 | Rose | 70/58 |

*Primary Examiner*—Victor N. Sakran
*Attorney, Agent, or Firm*—Fishman, Dionne & Cantor

[57] ABSTRACT

A security device for business machines, such as personal computers, typewriters and the like comprising a two piece clamp which has one end releasably affixable to said business machine and the other end thereof engagable with a locking cable or the like.

3 Claims, 3 Drawing Sheets

SECURITY DEVICE FOR BUSINESS MACHINES

BACKGROUND OF THE INVENTION

The present invention relates to a security device for use with business machines and the like. In particular, it relates to a two piece clamping device that may be releasably affixed to a business machine and a cable locking device or the like.

In recent years, business offices throughout the country have experienced a rapid growth in the types and variety of business machines being used in said offices. Typically, business offices may have such business machines as, personal computers, typewriters, copiers, fascimile machines and the like. Along with the growth in the number, type and use of the business machines, the theft of such machines has also expanded.

Accordingly, it is an object of the present invention to provide security devices for use with various business machines.

It is another object of the present invention to provide a security device for business machines which will permit a number of such machines to attached together by a locking cable.

It is a further object of the present invention to provide a security device for business machines which may be easily and quickly attached and detached from said machine.

It is another object of the present invention to provide a security device for business machines which is of relative simple construction, is readily fabricated in an economical manner and may be used with a minimum amount of instructions.

The above and other objects and advantages of the presen invention will become more apparent in view of the following discussion and the drawings.

DESCRIPTION OF THE PREFERRED EMBODIMENT

Figure 1:
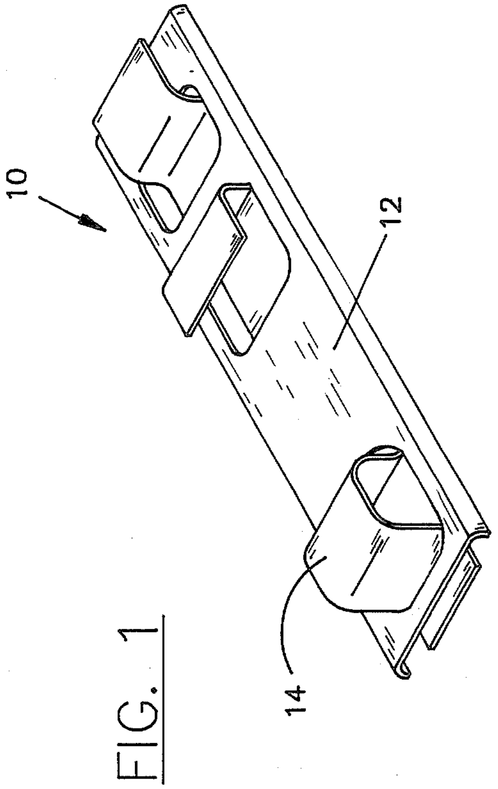
FIG. 1 is a perspective view of the security device of the present invention.
Figure 2:
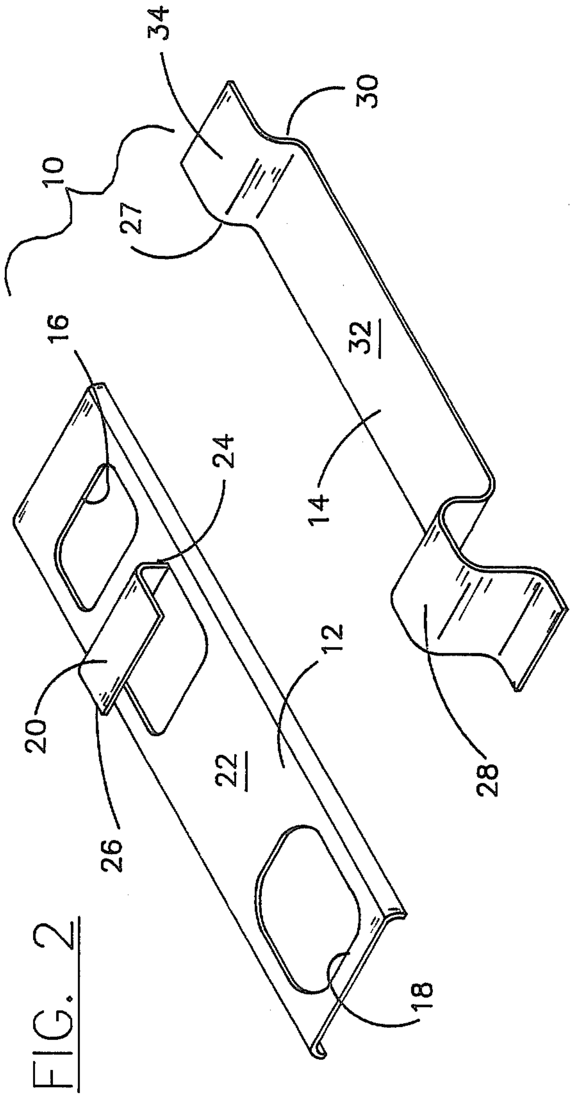
FIG. 2 is an exploded perspective view of the device showing in FIG. 1.

Referring in detail to the drawings, and particularly to FIGS. 1 and 2, it will be seen that the security device of the present invention is generally shown at 10. As shown the device 10 is comprised of an upper elongated member 12 and a lower elongated member 14. The upper member 12 is generally in the form of a U-shaped channel although a flat member is also contemplated. Said member 12 is provided with a first aperature or opening 16 adjacent one end thereof and a second aperature or opening 18 adjacent the other end thereof. Aperatures 16 and 18 are designed to receive elements of said lower member 14 which will be explained below.

The upper member 12 is also provide with L-shaped hook means 20 extending upwardly from the top surface 22 of said member. As shown, said hook means includes a vertical portion 24 and a horizontal portion 26 which is substantially parallel to said top surface 22 so as to provide a rearwardly open hook. As shown, said hook means 20 is integral with and formed from said member 12; however, separate hook means attached to the top surface 22 of said member 12 is also contemplated.

The lower member 14 is primarily flat stock having forwardly facing hook means 27 disposed at one end thereof and a U-shaped protuberance or projection 28 disposed at the other end thereof. The forewardly facing hook means 27 is comprised of a vertical portion 30 extending upwardly from the top surface 32 of said lower member 14 and a horizontal portion 34 substantially parallel to said top surface 32.

Figure 3:
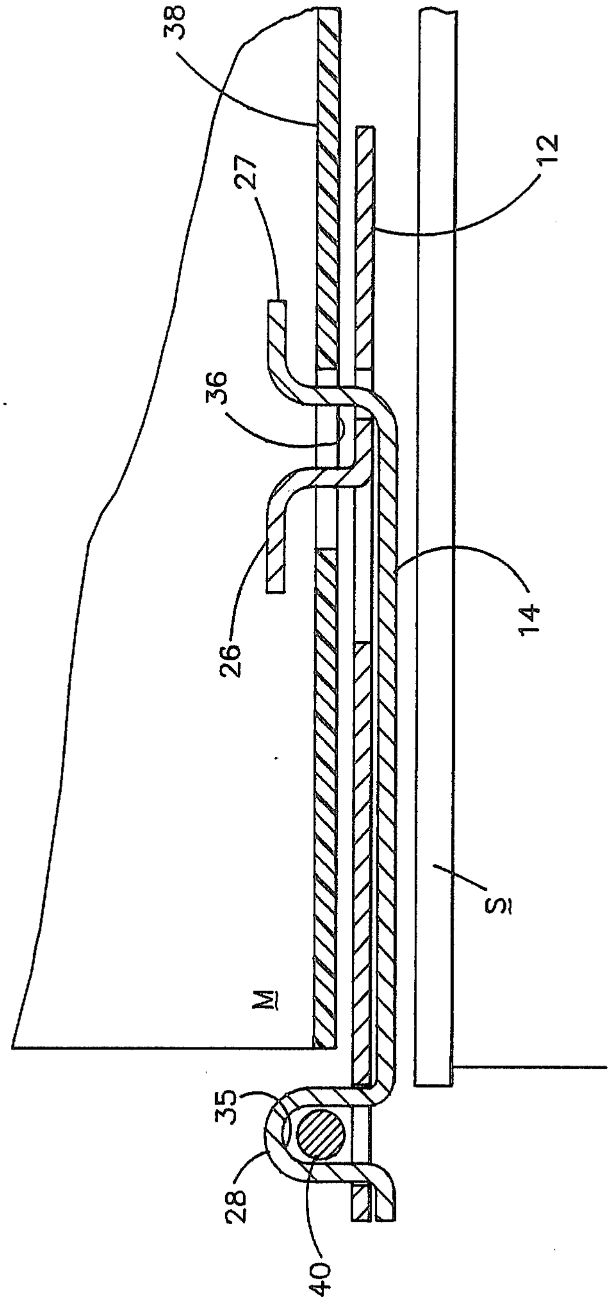
FIG. 3 is a side elevation view, with parts in sections and parts broken away, showing the security device of the present invention in an operative condition.

As shown in FIGS. 1 and 3, the lower member 14 is disposed beneath said upper member 12. It is positioned so that said forwardly facing hook means is in registration with the aperature 16, and the U-shaped protuberance 28 is in registration with aperature 18. As shown, when said lower member 14 and said upper member 12 are in registration as described above, the hook means 20 and 26 form clamping means which will be further described below and the U-shaped protuberance 28 in association with the top surface 22 of the upper member 12 forms a transversely disposed aperature 35 which will also be further described below.

With reference primarily to FIG. 3, the use of the security device of the present invention will be explained. A business machine M such as a computer or typewriter is usually supported above a work surface S by legs (not shown). Most such machines are provided with an aperature 36 in the bottom surface 38 for various purposes. As shown, the security device 10 of the present invention is located below said bottom surface 38 of the machine M in the space between the machine M and the work surface S. As further shown, the clamping means, comprising the forward facing hook means 27 of the lower member 14 of the device 10 and the rearward facing hook means 20 of the upper member 12 thereof, are disposed within said aperature 36 so that the vertical portions 24 and 30 of said hook means 20 and 27 extend upwardly into said aperature 36 whereby horizontal portions 26 and 34 extend forward and rearward over the inside surface of said bottom surface 38 of said machine M. When the device 10 is disposed in said position the U-shaped protuberance is in registration with said aperature 18.

The installation of the security device of the present invention is simple and quick. First, the hook means 20 of the top member 14 is inserted into aperature 36 of the machine M and moved to a position that is substantially parallel to the bottom surface 38 of said machine M. This is followed by inserting the hook means 27 of the bottom member 14 through the aperature 16 of the top member 12 and through the aperature 36 of the machine M. The lower member 14 is then pivoted about the intersection of the vertical and horizontal portions 30 and 34 of hook means 27 until the U-shaped protuberance is in registration with the aperature 18 of the upper member 12. A cable 40 may then be inserted into the aperature 35 thereby preventing removal of said device 10 from the aperature 36 in the bottom surface 38 of the machine M.

As will be understood by those skilled in the art, a plurality of business machines may be attached to a single length of wire cable 40 and the cable 40 may be locked to the work surface S.

As will be further understood by those skilled in the art, the upper and lower members 12 and 14 of the security device of the present invention is advantageously made from flat metal bar stock which may be bent, cut and/or stamped to provide the various components of the device.

While a preferred embodiment has been shown and described, various modifications, substitutions and/or alterations may be made thereto without departing from the spirit and scope of the invention. Accordingly, it is to be understood that the present invention has been described by way of illustration and not limitation.

What is claimed is:

1. A security device for business machines comprising an upper member and a lower member, said lower member having forwardly facing hook means extending upwardly therefrom disposed at one end thereof and an upwardly extending protuberance disposed at the other end thereof, said upper member having a first aperature disposed adjacent one end thereof for receiving said forward facing hook means of said lower member, a second aperature disposed adjacent the other end thereof for receiving said protuberance of said lower member and rearwardly facing hook means extending upwardly therefrom diposed adjacent said first aperature whereby said forwardly facing hook means and said rearward facing hook means provides clamping means for said attachment of said device to said business machines and said protuberance when received by said second aperature provides cable locking means to prevent removal of said device from said machine.

2. The security device of claim 1 wherin said forwardly facing hook means comprises a vertical portion and a horizontal portion substantially parallel to the top surface of said lower member and said rearwardly facing hook means comprises a vertical portion and a horizontal portion substantially parallel to the top surface of said upper member.

3. The security device of claim 2 wherein said clamping means is attached to said business machine by extending said forwardly facing hook means and said rearwardly facing hook means into an aperature in the bottom surface of said machine and pivoting said lower member into registration with said upper member whereby said protuberance extends through said second aperature of said upper member.

* * * * *